United States Patent
Del Nero et al.

(10) Patent No.: US 9,200,665 B2
(45) Date of Patent: Dec. 1, 2015

(54) CONNECTING DEVICE PROVIDED WITH A GUARD FOR COVERING THE END OF A THREADED STEM

(71) Applicant: FIAT GROUP AUTOMOBILES S.P.A., Turin (IT)

(72) Inventors: Gianfranco Del Nero, Turin (IT); Federico Peirone, Turin (IT)

(73) Assignee: FIAT GROUP AUTOMOBILES, S.P.A., Turin (IT)

( * ) Notice: Subject to any disclaimer, the term of this patent is extended or adjusted under 35 U.S.C. 154(b) by 0 days.

(21) Appl. No.: 14/225,565

(22) Filed: Mar. 26, 2014

(65) Prior Publication Data

US 2014/0341676 A1 Nov. 20, 2014

(30) Foreign Application Priority Data

Mar. 26, 2013 (IT) .............................. TO2013A0246

(51) Int. Cl.
*F16B 37/14* (2006.01)
*F16B 5/02* (2006.01)
*F16B 37/06* (2006.01)

(52) U.S. Cl.
CPC . *F16B 37/14* (2013.01); *F16B 5/02* (2013.01); *F16B 37/061* (2013.01); *F16B 37/062* (2013.01)

(58) Field of Classification Search
CPC ....... F16B 37/061; F16B 37/14; F16B 41/002
USPC ........................ 411/171, 429, 372.6, 533, 999
See application file for complete search history.

(56) References Cited

U.S. PATENT DOCUMENTS

| | | | | |
|---|---|---|---|---|
| 1,727,590 | A * | 9/1929 | Ferry | 411/430 |
| 2,310,532 | A * | 2/1943 | Langmaid | 411/103 |
| 2,334,046 | A * | 11/1943 | Tinnerman | 411/374 |
| 2,592,028 | A * | 4/1952 | Hammitt et al. | 52/489.1 |
| 2,767,609 | A * | 10/1956 | Cousino | 411/436 |
| 2,857,597 | A * | 10/1958 | Morgan, Jr. | 2/414 |
| 3,238,581 | A * | 3/1966 | Sawyer | 24/71 T |
| 5,163,797 | A * | 11/1992 | Patti | 411/431 |
| 5,842,894 | A * | 12/1998 | Mehlberg | 439/801 |
| 6,012,889 | A * | 1/2000 | Robbins et al. | 411/372.6 |
| 6,036,421 | A * | 3/2000 | Demaray | 411/432 |
| 6,758,645 | B2 * | 7/2004 | Curley et al. | 411/111 |
| 6,893,197 | B2 * | 5/2005 | Lee | 411/111 |
| 2004/0042871 | A1 | 3/2004 | Wojciechowski | |
| 2009/0169327 | A1 * | 7/2009 | Wu | 411/106 |

FOREIGN PATENT DOCUMENTS

| | | |
|---|---|---|
| DE | 1801456 | 11/1969 |
| EP | 0930440 | 7/1999 |
| JP | 2007137322 | 6/2007 |
| JP | 2007283884 | 11/2007 |

OTHER PUBLICATIONS

Italian Search Report Dated Nov. 13, 2013 for Corresponding Italian Application No. TO2013 00246.

* cited by examiner

*Primary Examiner* — Flemming Saether
(74) *Attorney, Agent, or Firm* — Gottlieb, Rackman & Reisman, P.C.

(57) ABSTRACT

A connecting device has a nut and a guard adapted to cover the end of a threaded stem which, in use, protrudes from the nut; the guard forms part of a plate, which is obtained in one piece and has a base which carries the nut.

14 Claims, 2 Drawing Sheets

CONNECTING DEVICE PROVIDED WITH A GUARD FOR COVERING THE END OF A THREADED STEM

The present invention relates to a connecting device provided with a guard for covering the end of a threaded stem.

BACKGROUND OF THE INVENTION

In vehicles, the need is felt to avoid cracking or breakage of containers with liquids, in particular flammable liquids, in case of accidents, such as the fuel tank, the filter for diesel fuel, etc. . . . in order to prevent leakage of said liquids.

In particular, the fuel tanks are made of plastic material and may be damaged by the screws threads which are arranged in adjacent areas and that protrude with respect to the nut screw in which they are screwed. Therefore, it is appropriate to prevent the threads from coming into contact with the tank surface. Said need occurs, in particular, in the cars, for the screws that secure the rear seats to the chassis.

To fulfill this requirement, it is known to cover the protruding end of the screws by placing a metal guard between the outer surface of the tank and said end. The guard is shaped and dimensioned from time to time according to the spaces that are actually available and is fixed to the chassis by welding, generally after having already fixed the rear seats.

The known solutions of the type just described are hardly satisfactory since they are not always effective.

In fact, the welds that hold the guards to the chassis may fail during impacts, therefore said guards can lose their original position, and not fulfill their tank protective function.

Furthermore, guards of the known type are not standard and require relatively extended time to be fixed to the chassis.

GB1231963A describes a solution corresponding to the preamble of claim 1 and involving a tab which is folded to cover the end of a screw and is arranged between the chassis and the nut so as to remain locked as the nut is tightened. However, this solution can give rise to mounting mistakes.

SUMMARY OF THE INVENTION

Purpose of the present invention is to provide a connecting device provided with a guard for covering the end of a threaded stem, which allows to solve in a simple and economic way the drawbacks stated above.

According to the present invention a connecting device provided with a guard for covering the end of a threaded stem, as defined in claim 1 is provided.

BRIEF DESCRIPTION OF THE DRAWINGS

For a better understanding of the present invention a preferred embodiment is now described, purely by way of non-limiting example, with reference to the accompanying drawings, wherein.

DETAILED DESCRIPTION OF THE INVENTION

Figure 1:
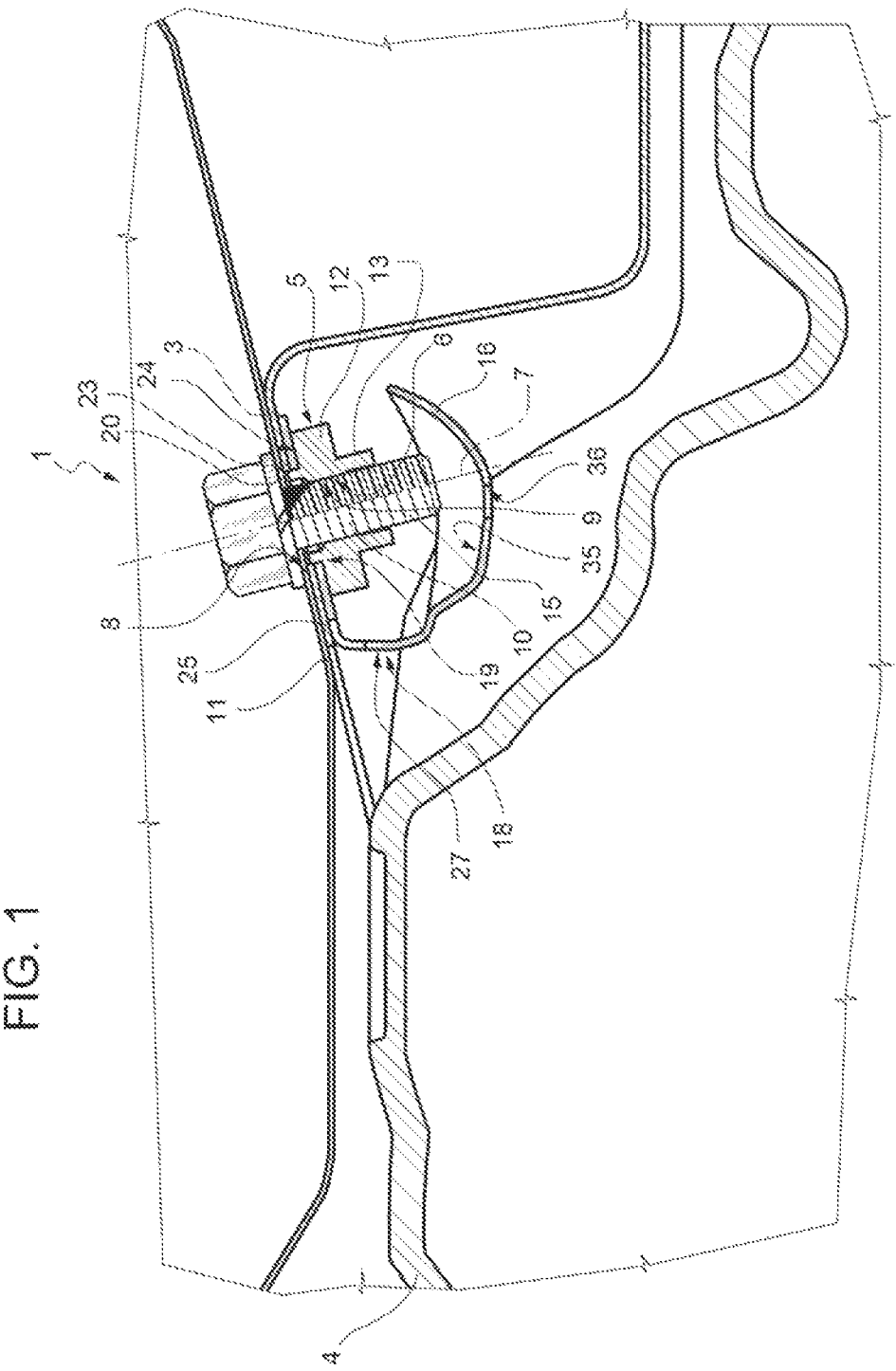
FIG. 1 is a sectional view showing a vehicle tank and a preferred embodiment of the connecting device provided with a guard for covering the end of a threaded stem according to the present invention.

In FIG. 1, the reference number 1 indicates a connecting device, which is fixed to a chassis portion 3 in an area adjacent to a tank 4 (partially shown) on a vehicle.

The connecting device 1 comprises a nut 5, made of metal material and having a hole 6, which is a through hole along an axis 7 and is coaxial with a hole 8 made in the chassis portion 3.

The hole 6 comprises a threaded portion 9 in which a threaded stem 10 is screwed, to fix a component 11 (e.g. the structure of a rear seat) to the chassis portion 3. Preferably, the nut 5 comprises an intermediate portion 12, defining the threaded portion 9 of the hole 6, and an end portion 13, which has an outer diameter smaller than that of the portion 12 and is coaxial and immediately successive with respect to the portion 12.

The threaded stem 10 passes through the hole 8 and axially protrudes from the portion 13 with its end 15, whose threads are relatively sharp and may therefore damage the tank 4 in case of an accident. To avoid said damage, the connecting device 1 comprises a guard 16 arranged in the space between the end 15 and the outer surface of the tank 4.

According to an aspect of the present invention, the guard 16 is part of a plate 18, which is defined by a single piece, distinct from the nut 5, has a hole 19 engaged by an end collar 20 of the nut 5 and is fixed to the latter.

Advantageously, the plate 18 is made of metal material and, in particular, has a constant thickness.

Preferably, the collar 20 has an outer diameter smaller than that of the portion 12 and is coaxial with respect to the immediately preceding portion 12. The nut 5 is fixed to the plate 18 by means of interference coupling on the collar 20, so that the hole 19 has an edge 23 that faces axially a shoulder 24 of the portion 12.

As an alternative to the interference coupling, the plate 18 may be fixed by riveting or upsetting, so as to plastically deform a lip or appendage of the collar 20 and clamp the edge 23 of the hole 19 in a groove between the portion 12 and the collar 20.

If she friction between the edge 23 and the outer surface of the nut 5 is not sufficient to prevent the rotation of the plate 18 about the axis 7, an additional angular retaining system may also be provided, for example a radial tooth and a corresponding seat, engaged one into the other, or a non-circular profile of the edge 23 and the outer surface of the collar 20.

Figure 2:
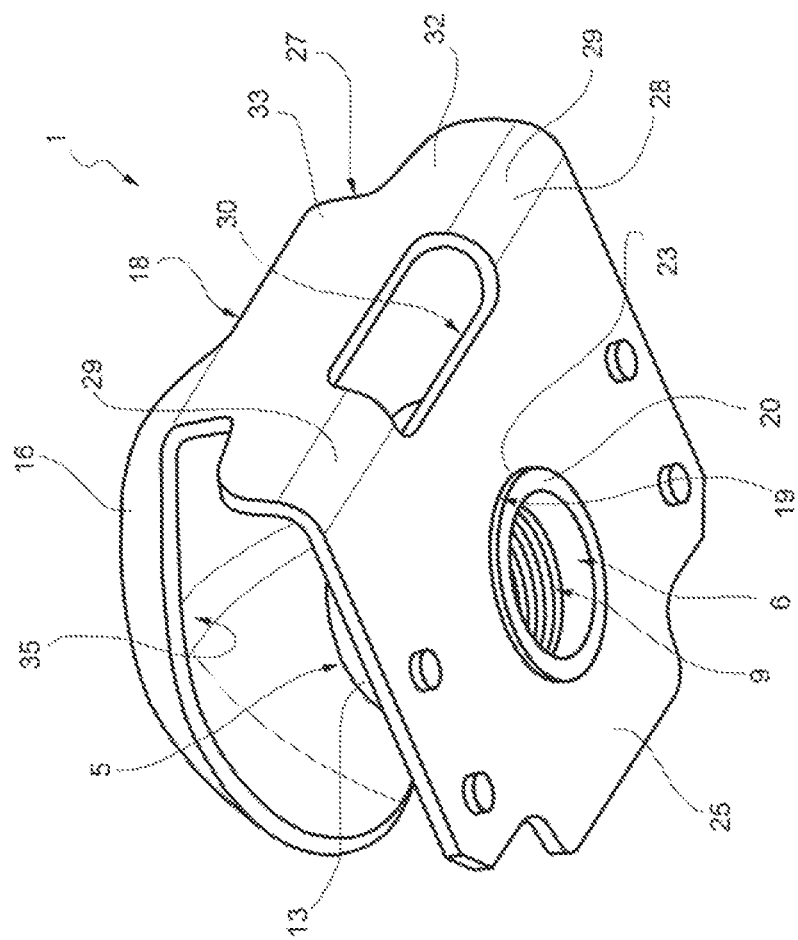
FIG. 2 shows, in perspective and in enlarged scale, the connecting device of FIG. 1.

With reference to FIG. 2, advantageously, the plate 18 comprises a base 25, which is substantially flat, extends perpendicularly to the axis 7, and defines the hole 19. The plate 18 also comprises a single side arm 27 arranged between the guard 16 and a side 28 of the base 25.

The arm 27 is substantially parallel to the axis and preferably is connected to the base 25 by means of two curved portions 29, which are aligned along the side 28 and are separated from each other by an opening 30 made along the side 28. The opening 30 defines a weakening adapted to favour elastic flexing and/or bending of the arm 27 with respect to the base 25.

The arm 27 also comprises an intermediate segment 32 and an end segment 33, which is connected to the guard 16 and is fixed to the portions 29 by way of the segment 32. The width of the segment 33 (measured in the direction parallel to the side 28) is smaller than that of segment 32 and is substantially equal to that of the guard 16.

With reference to FIG. 1, the guard 16 has a substantially cap or umbrella shape, with the concavity facing towards the nut 5 so as to define a recess 35 which in use accommodates the tip of the threaded stem 10. In particular, the guard 16 has a hole 36 which allows cataphoresis flow.

During assembly, after having arranged the nut 5 in a coaxial position to the hole 8 and having oriented the plate 18, so as to have the arm 27 between the nut 5 and the tank 4, the device 1 is fixed by welding the base 25 to the chassis portion 3, for example by spot welding.

The threaded stem 10 is then screwed into the nut 5 to fix the component 11: thanks to the tightening of the threaded stem 10, the device 1 remains securely locked against the chassis portion 3 (also in the case where the welding points may fail). Therefore, the welding of the base 25 to the chassis portion 3 performs only the function of maintaining the device 1 in the desired position until the tightening of the threaded stem 10.

In case of failure of the welding points between the base 25 and the chassis portion 3, after tightening the threaded stem 10 the plate 18 remains axially constrained, on one side, by the chassis portion 3 and, on the other side, by the portion 12.

In case of an accident, the plate 18 remains firmly coupled to the chassis portion 3, even when the latter is subject to deformations. In particular, the nut 5 gives an excellent locking guarantee both towards the threaded stem 10, and towards the plate 18.

At the same time, it is possible that the tank 4 and the threaded stem 10 are approaching one another, precisely because of said deformations, but the arm 27 and the guard 16 prevent the threads 15 from being in direct contact against the outer surface of the tank 4.

Furthermore, the particular shape of the arm 27 and, especially, of the guard 16 increase the guard degree of the end 15.

Therefore, it is evident how the device 1 is extremely effective to protect the tank 4. In particular, the device 1 is able to protect the tank 4 even in the presence of tests carried out according to the regulations in force (rear impact at 80 km/h).

Meanwhile, the device 1 has a relatively low number of components and can be installed in a relatively simple and fast manner on the vehicle. In fact, the nut 5 and the guard 16 are fixed one with respect to the other, so it is possible to arrange the guard 16 in the desired position relatively easily during coupling of the device 1 to the chassis portion 3.

Thanks to its construction, the device 1 is not only relatively easy to handle and mount, but also has a relatively small dimension, so it may be used practically in all cases in a standard way, i.e. without design and construction modification to the plate 18.

From the above it is, finally, evident that the device 1 described and illustrated may be subject to modifications and variants which do not depart from the scope of protection of the present invention, as defined in the appended claims.

In particular, the fixing of the device 1 to the chassis portion 3 may be absent or different from welding; and/or the plate 18 may be coupled to the nut 5 only in a provisional or labile way, instead of being fixed to the collar 20, and then remain locked in a fixed position only after having tightened the threaded stem 10.

Also, the shape of the arm 27 and/or of the guard 16 may be different from what is illustrated by way of example.

Finally, the collar 20 and the portions 12,13 may have a polygonal perimeter, rather than cylindrical; and or the portion 13 may be absent.

The invention claimed is:

1. A connecting device, comprising:
    a nut including a threaded portion for mating with a threaded stem; and
    a plate formed in one piece and comprising:
        a) a guard for covering one end of said threaded stem which, when mated with the nut, axially protrudes from the nut;
        b) a base; and
        c) a single side arm extending between the base and the guard from one side of the base and the guard, joining said guard to said base,
    wherein the nut is fixed to the base, and
    wherein the base is welded to a chassis portion.

2. The device according to claim 1, wherein the base includes a hole and the nut comprises a first end portion, which engages the hole of said base.

3. The device according to claim 2, wherein the first end portion of the nut is fixed to the base.

4. The device according to claim 3, wherein the first end portion of the nut is fixed to the base by an interference fit or by upsetting said first end portion.

5. The device according to claim 2, wherein the nut comprises an intermediate portion having an outer diameter that is larger than an outer diameter of said first end portion so as to define an axial shoulder with said base axially resting against said axial shoulder.

6. The device according to claim 5, wherein the nut comprises a second end portion, which is opposite to said first end portion and has an outer diameter that is smaller than that the outer diameter of said intermediate portion.

7. The device according to claim 1, wherein the base is substantially flat and extends perpendicularly to an axis of said nut.

8. The device according to claim 1, wherein the plate is made of metal material.

9. The device according to claim 1, wherein the guard defines a recess facing said nut.

10. The device according to claim 9, wherein the guard defines a cap, which is substantially coaxial to said nut.

11. The device according to claim 1, further comprising two curved portions, which are aligned along the one side of said base, joining said side arm to said base, the curved portions being separated from each other by an opening along said one side of the base.

12. The device according to claim 1, wherein the side arm includes an intermediate segment and an end segment, the end segment joining the side arm to said guard and having a width which is smaller than a width of the intermediate segment and is substantially equal to a width of the of said guard.

13. The device according to claim 1, wherein the guard is cantilevered from the side arm.

14. The device according to claim 1, wherein the side arm is elastically flexible with respect to the base such that upon an application of force on the guard, the side arm bends and the guard is moveable away from the base and moveable toward the base.

* * * * *